United States Patent
Sato et al.

(10) Patent No.: US 10,941,254 B2
(45) Date of Patent: Mar. 9, 2021

(54) MOLDED ARTICLE AND METHOD OF PRODUCING THE SAME

(71) Applicant: SUMITOMO CHEMICAL COMPANY, LIMITED, Tokyo (JP)

(72) Inventors: Yoshinori Sato, Niihama (JP); Nao Inoue, Ichihara (JP); Akinori Bando, Tsukuba (JP); Kenta Ishizuka, Ichihara (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 40 days.

(21) Appl. No.: 16/473,803

(22) PCT Filed: Jan. 17, 2018

(86) PCT No.: PCT/JP2018/001175
§ 371 (c)(1),
(2) Date: Jun. 26, 2019

(87) PCT Pub. No.: WO2018/135523
PCT Pub. Date: Jul. 26, 2018

(65) Prior Publication Data
US 2019/0322815 A1    Oct. 24, 2019

(30) Foreign Application Priority Data
Jan. 18, 2017  (JP) .............................. JP2017-006496

(51) Int. Cl.
*C08G 83/00* (2006.01)
*B62D 29/04* (2006.01)
(Continued)

(52) U.S. Cl.
CPC .......... *C08G 83/007* (2013.01); *B62D 29/04* (2013.01); *B29C 43/52* (2013.01); *B29C 43/56* (2013.01);
(Continued)

(58) Field of Classification Search
CPC ...... C08G 83/007; B62D 29/04; B29C 43/56; C08F 290/00
See application file for complete search history.

(56) References Cited

U.S. PATENT DOCUMENTS

| 4,550,057 A | 10/1985 | Kataoka |
| 2015/0140279 A1 | 5/2015 | Kang et al. |

(Continued)

FOREIGN PATENT DOCUMENTS

| EP | 2397527 A1 | 12/2011 |
| JP | 58-171918 A | 10/1983 |

(Continued)

OTHER PUBLICATIONS

English machine translation of WO-2016/171187-A1, published Oct. 27, 2016.

(Continued)

*Primary Examiner* — Mark S Kaucher
(74) *Attorney, Agent, or Firm* — Birch, Stewart, Kolasch & Birch, LLP

(57) ABSTRACT

Provided is a molded article comprising a resin, wherein the molded article has a Hermann's degree of orientation f of 0.006 or more which is determined by the following formula (1) and the following formula (2) based on an azimuth angle distribution curve obtained by wide-angle X-ray diffraction measurement and a haze of less than 10%, the resin comprises a structural unit derived from a monomer comprising a carbon-carbon double bond at the end and a structural unit derived from a polyrotaxane compound, and the polyrotaxane compound comprises cyclic molecules comprising a functional group capable of addition polymerization with the carbon-carbon double bond, a linear molecule clathrated in a skewer shape by the cyclic molecules, and blocking groups (Continued)

disposed at the ends of the linear molecule to prevent elimination of the cyclic molecules.

6 Claims, 1 Drawing Sheet

(51) Int. Cl.
   *B29C 43/52* (2006.01)
   *B29C 43/56* (2006.01)
   *B29K 33/00* (2006.01)
   *B29K 105/00* (2006.01)
   *H04M 1/02* (2006.01)
   *H04M 1/18* (2006.01)

(52) U.S. Cl.
   CPC .. *B29K 2033/12* (2013.01); *B29K 2105/0002* (2013.01); *H04M 1/0266* (2013.01); *H04M 1/18* (2013.01)

(56) References Cited

U.S. PATENT DOCUMENTS

| | | |
|---|---|---|
| 2015/0299504 A1 | 10/2015 | Kang et al. |
| 2016/0229963 A1 | 8/2016 | Masuhara et al. |
| 2016/0282902 A1 | 9/2016 | Kang et al. |
| 2017/0198138 A1 | 7/2017 | Nishioka et al. |
| 2017/0335044 A1 | 11/2017 | Hayashi |
| 2018/0215837 A1 | 8/2018 | Sato et al. |

FOREIGN PATENT DOCUMENTS

| | | |
|---|---|---|
| JP | 2015-533677 A | 11/2015 |
| JP | 2017-57269 A | 3/2017 |
| WO | WO 2011/108515 A1 | 9/2011 |
| WO | WO 2015/064308 A1 | 5/2015 |
| WO | WO 2016/031664 A1 | 3/2016 |
| WO | WO 2016072356 A1 | 5/2016 |
| WO | WO 2016/171187 A1 | 10/2016 |
| WO | WO 2017/014223 A1 | 1/2017 |

OTHER PUBLICATIONS

International Search Report, issued in PCT/JP2018/001175, PCT/ISA/210, dated Apr. 10, 2018.
Extended European Search Report for European Application No. 18742152.4, dated Aug. 10, 2020.

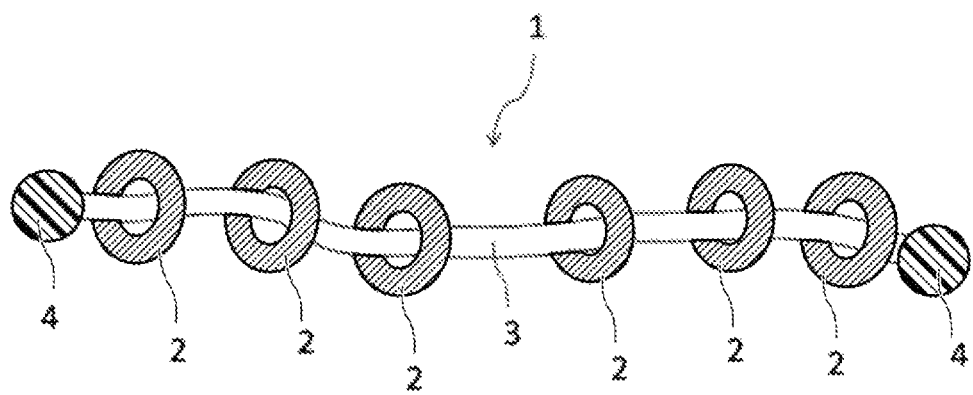

MOLDED ARTICLE AND METHOD OF PRODUCING THE SAME

TECHNICAL FIELD

The present invention relates to a molded article comprising a resin comprising a structural unit derived from a monomer comprising a carbon-carbon double bond at the end and a structural unit derived from a polyrotaxane compound, and a method of producing the same.

BACKGROUND ART

Molded articles such as resin sheets excellent in transparency are used in various applications as glass substitutes because they are lightweight. In recent years, a resin molded article having excellent impact resistance that can be applied to applications requiring higher strength is demanded, and development of the resin molded article has been conducted. For example, JP-A No. 58-171918 (Patent Document 1) discloses an acrylic sheet with improved impact resistance produced by rolling polymethyl methacrylate in high viscosity state at a stretch ratio of 3 or more.

PRIOR ART DOCUMENT

Patent Document

[Patent Document 1] Japanese Unexamined Patent Application Publication (JP-A) No. 58-171918

SUMMARY OF THE INVENTION

Problem to be Solved by the Invention

Although the acrylic sheet described in Patent Document 1 is excellent in transparency, impact resistance is not always satisfactory.

An object of the present invention is to provide a molded article having excellent impact resistance without impairing transparency and a method of producing the same.

Means for Solving the Problem

The present invention provides a molded article and a method of producing the molded article described below.

[1] A molded article comprising a resin, wherein
the above-described molded article has a Hermann's degree of orientation f of 0.006 or more which is determined by the following formula (1) and the following formula (2) based on an azimuth angle distribution curve obtained by wide-angle X-ray diffraction measurement and a haze of less than 10%,
the above-described resin has a structural unit derived from a monomer comprising a carbon-carbon double bond at the end, and a structural unit derived from a polyrotaxane compound, and
the above-described polyrotaxane compound comprises
cyclic molecules comprising a functional group capable of addition polymerization with the carbon-carbon double bond,
a linear molecule clathrated in a skewer shape by the cyclic molecules and
blocking groups disposed at the ends of the linear molecule to prevent elimination of the cyclic molecules:

[Chemical Formula]

$$f = \frac{3\langle \cos^2 \phi \rangle - 1}{2} \qquad \text{formula (1)}$$

$$\langle \cos^2 \phi \rangle = \frac{\int_0^{\pi/2} I(\phi)\cos^2\phi \sin\phi \, d\phi}{\int_0^{\pi/2} I(\phi)\sin\phi \, d\phi} \qquad \text{formula (2)}$$

wherein I (φ) represents the luminance at the azimuth angle φ in the azimuth angle distribution curve obtained by wide-angle X-ray diffraction measurement.

[2] The molded article according to [1], wherein the functional group capable of addition polymerization with the carbon-carbon double bond is a (meth)acryloyl group.

[3] The molded article according to [1] or [2], wherein the monomer comprising a carbon-carbon double bond at the end is a (meth)acrylic acid ester.

[4] An automotive material comprising the molded article according to any one of [1] to [3].

[5] A display window protective plate comprising the molded article according to any one of [1] to [3].

[6] A method of producing a molded article comprising a resin, wherein
the above-described resin comprises a structural unit derived from a monomer comprising a carbon-carbon double bond at the end, and a structural unit derived from a polyrotaxane compound,
the above-described polyrotaxane compound comprises
cyclic molecules comprising a functional group capable of addition polymerization with the carbon-carbon double bond,
a linear molecule clathrated in a skewer shape by the cyclic molecules and
blocking groups disposed at the ends of the linear molecule to prevent elimination of the cyclic molecules, and
the above-described production method comprises a step of stretching the resin at a temperature not lower than 30° C. lower than the glass transition temperature of the resin and lower than the thermal decomposition temperature of the resin.

Advantageous Effect of the Invention

According to the present invention, a molded article which is excellent in impact resistance can be obtained, without impairing transparency.

BRIEF EXPLANATION OF DRAWING

FIG. 1 is a schematic view conceptually showing the basic structure of polyrotaxane.

MODES FOR CARRYING OUT THE INVENTION

In the present specification, the following terms are defined or explained as follows.

"(Meth)acrylic acid" refers to methacrylic acid or acrylic acid, and "(meth)acryloyl group" refers to a methacryloyl group or an acryloyl group.

The "ethylenically unsaturated" compound is a compound comprising a group represented by —CR=CH$_2$ (wherein, R represents a hydrocarbyl group which may be substituted). For example, the ethylenically unsaturated carboxylic acid refers to a carboxylic acid comprising a group represented by —CR=CH$_2$ (wherein, R represents a hydrocarbyl group) described above.

The "hydrocarbyl group" refers to a monovalent group obtained by removing one hydrogen atom from a hydrocarbon.

"Addition polymerization" is one of chain polymerization. In addition polymerization, growth active species (radicals, cations, anions) are generated by a polymerization initiator or the like, and the reaction proceeds by a chain attack of monomers on the active species. Addition polymerization is a reaction consisting of elementary reactions such as an initial reaction, a growth reaction, a transfer reaction and a termination reaction.

The "polyrotaxane compound" is a compound comprising cyclic molecules comprising a functional group capable of addition polymerization with the carbon-carbon double bond of the monomer comprising a carbon-carbon double bond at the end, a linear molecule clathrated in a skewer shape by the cyclic molecules, and blocking groups disposed at the ends of the linear molecule to prevent the elimination of the cyclic molecules.

The "polyrotaxane" is a compound comprising a cyclic molecule A which is a cyclic molecule comprising no functional group capable of addition polymerization with a carbon-carbon double bond, a linear molecule clathrated in a skewer shape by the cyclic molecule A, and blocking groups disposed at the ends of the linear molecule to prevent elimination of the cyclic molecule A.

<Molded Article>

The molded article according to the present invention comprises a resin comprising a structural unit derived from a monomer comprising a carbon-carbon double bond at the end and a structural unit derived from a polyrotaxane compound (hereinafter, also referred to as resin P).

(1) Monomer Comprising a Carbon-carbon Double Bond at the End

The monomer comprising a carbon-carbon double bond at the end includes, for example, (meth)acrylic acid esters, aromatic vinyl compounds, vinyl cyanide compounds, ethylenically unsaturated carboxylic acid hydroxyalkyl esters, ethylenically unsaturated sulfonic acid esters, ethylenically unsaturated carboxylic acid amides, ethylenically unsaturated carboxylic acids, ethylenically unsaturated sulfonic acids, ethylenically unsaturated alcohols or esters thereof, ethylenically unsaturated ether compounds, ethylenically unsaturated amine compounds, ethylenically unsaturated silane compounds, vinyl halides, aliphatic conjugated diene compounds and the like. The monomer comprising a carbon-carbon double bond at the end may be used alone or in combination of two or more.

As the above-described (meth)acrylic acid ester, acrylic acid esters or methacrylic acid esters are mentioned. The (meth)acrylic acid ester may be used alone or in combination of two or more.

The above-described acrylic acid ester is preferably one comprising at least one group selected from the group consisting of an alkyl group having 1 to 12 carbon atoms, a cycloalkyl group having 3 to 12 carbon atoms and an aryl group having 6 to 12 carbon atoms, and examples thereof include methyl acrylate, ethyl acrylate, lauryl acrylate, benzyl acrylate, cyclohexyl acrylate and the like. The acrylic acid ester may be used alone or in combination of two or more.

The above-described methacrylic acid ester is preferably one comprising at least one group selected from the group consisting of an alkyl group having 1 to 12 carbon atoms, a cycloalkyl group having 3 to 12 carbon atoms and an aryl group having 6 to 12 carbon atoms, and examples thereof include methyl methacrylate, ethyl methacrylate, lauryl methacrylate, benzyl methacrylate, cyclohexyl methacrylate and the like. The methacrylic acid ester may be used alone or in combination of two or more.

Examples of the aromatic vinyl compound include styrene, α-methylstyrene, o-methylstyrene, p-methylstyrene, o-ethylstyrene, p-ethylstyrene, α-chlorostyrene, p-chlorostyrene, p-methoxystyrene, p-aminostyrene, p-acetoxystyrene, sodium styrenesulfonate, α-vinylnaphthalene, sodium 1-vinylnaphthalene-4-sulfonate, 2-vinylfluorene, 2-vinylpyridine, 4-vinylpyridine and the like. The aromatic vinyl compound may be used alone or in combination of two or more.

Examples of the vinyl cyanide compound include acrylonitrile, α-chloroacrylonitrile, α-methoxyacrylonitrile, methacrylonitrile, α-chloromethacrylonitrile, α-methoxymethacrylonitrile, vinylidene cyanide and the like. The vinyl cyanide compound may be used alone or in combination of two or more.

Examples of the ethylenically unsaturated carboxylic acid hydroxyalkyl ester include hydroxyethyl acrylate, hydroxyethyl methacrylate, hydroxypropyl acrylate, hydroxypropyl methacrylate, hydroxybutyl acrylate, hydroxybutyl methacrylate and the like. The ethylenically unsaturated carboxylic acid hydroxyalkyl ester may be used alone or in combination of two or more.

Examples of the ethylenically unsaturated sulfonic acid ester include alkyl vinyl sulfonates, alkyl isoprene sulfonates and the like. The ethylenically unsaturated sulfonic acid ester may be used alone or in combination of two or more.

Examples of the ethylenically unsaturated carboxylic acid amide include acrylamide, methacrylamide, N-butoxymethyl acrylamide, N-butoxymethyl methacrylamide, N-butoxyethyl acrylamide, N-butoxyethyl methacrylamide, N-methoxymethyl acrylamide, N-methoxymethyl methacrylamide, N,N-propoxymethyl acrylamide, N,N-propoxymethyl methacrylamide, N-methyl acrylamide, N-methyl methacrylamide, N,N-dimethyl acrylamide, N,N-dimethyl methacrylamide, N,N-diethyl acrylamide, N,N-diethyl methacrylamide and the like. The ethylenically unsaturated carboxylic acid amide may be used alone or in combination of two or more.

Examples of the ethylenically unsaturated carboxylic acid include acrylic acid, methacrylic acid, itaconic acid, fumaric acid, fumaric anhydride, maleic acid, maleic anhydride and the like. The above-described ethylenically unsaturated carboxylic acid may be used alone or in combination of two or more.

Examples of the ethylenically unsaturated sulfonic acid include vinyl sulfonic acid, isoprene sulfonic acid and the like. The ethylenically unsaturated sulfonic acid may be used alone or in combination of two or more.

Examples of the ethylenically unsaturated alcohol or ester thereof include allyl alcohol, methallyl alcohol, vinyl acetate, vinyl propionate, vinyl butyrate, vinyl stearate, vinyl benzoate, allyl acetate, methallyl caproate, allyl laurate, allyl benzoate, vinyl alkyl sulfonate, allyl alkyl sulfonate, vinyl aryl sulfonate, and esters thereof, and the like. The ethylenically unsaturated alcohol or ester thereof may be used alone or in combination of two or more.

Examples of the ethylenically unsaturated ether compound include methyl vinyl ether, ethyl vinyl ether, n-propyl vinyl ether, isopropyl vinyl ether, methyl allyl ether, ethyl allyl ether and the like. The ethylenically unsaturated ether compound may be used alone or in combination of two or more.

Examples of the ethylenically unsaturated amine compound include vinyldimethylamine, vinyldiethylamine, vinyldiphenylamine, allyldimethylamine, methallyldiethylamine and the like. The ethylenically unsaturated amine compound may be used alone or in combination of two or more.

Examples of the ethylenically unsaturated silane compound include vinyltriethylsilane, methylvinyldichlorosilane, dimethylallylchlorosilane, vinyltrichlorosilane and the like. The ethylenically unsaturated silane compound may be used alone or in combination of two or more.

Examples of the vinyl halide include vinyl chloride, vinylidene chloride, 1,2-dichloroethylene, vinyl bromide, vinylidene bromide, 1,2-dibromoethylene and the like. The vinyl halide may be used alone or in combination of two or more.

Examples of the aliphatic conjugated diene compound include 1,3-butadiene, 2-methyl-1,3-butadiene, 2,3-dimethyl-1,3-butadiene, 2-neopentyl-1,3-butadiene, 2-chloro-1,3-butadiene, 1,2-dichloro-1,3-butadiene, 2,3-dichloro-1,3-butadiene, 2-bromo-1,3-butadiene, 2-cyano-1, 3-Butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,4-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene 3, 4-dimethyl-1,3-hexadiene, 3,5-dimethyl-1,3-hexadiene and the like. The aliphatic conjugated diene compound may be used alone or in combination of two or more.

The monomer comprising a carbon-carbon double bond at the end is preferably a (meth)acrylic acid ester from the viewpoint of enhancing the transparency and impact resistance of the molded article.

(2) Polyrotaxane Compound

The polyrotaxane compound is a compound comprising cyclic molecules comprising a functional group capable of addition polymerization with the carbon-carbon double bond of the monomer comprising a carbon-carbon double bond at the end, a linear molecule clathrated in a skewer shape by the cyclic molecules, and blocking groups disposed at the ends of the linear molecule to prevent the elimination of the cyclic molecules.

FIG. 1 is a schematic view conceptually showing the basic structure of the polyrotaxane compound. In FIG. 1, the polyrotaxane compound 1 comprises a linear molecule 3, cyclic molecules 2 comprising a functional group capable of addition polymerization with a carbon-carbon double bond, and blocking groups 4 disposed at the both ends of the linear molecule 3 may be used alone or in combination of two or more.

The linear molecule 3 is included by the cyclic molecules 2, penetrating the opening of the cyclic molecule 2. The state shown in FIG. 1, that is, the state in which the linear molecule 3 penetrates the opening of the cyclic molecule 2 is defined herein as "the linear molecule is clathrated in a skewer shape".

The polyrotaxane compound may comprise one or more cyclic molecules comprising a functional group capable of addition polymerization with a carbon-carbon double bond. The cyclic molecule comprising a functional group capable of addition polymerization with a carbon-carbon double bond is, for example, a cyclic molecule A described later provided with a functional group capable of addition polymerization with a carbon-carbon double bond.

Examples of the functional group capable of addition polymerization with a carbon-carbon double bond include, for example, a vinyl group, an acryloyl group, a methacryloyl group and the like, preferably a methacryloyl group. A hydroxyl group is not included in the functional group capable of addition polymerization with a carbon-carbon double bond. The cyclic molecule comprising a functional group capable of addition polymerization with a carbon-carbon double bond may comprise one or two or more of the above-mentioned functional groups, and may comprise groups other than the functional group capable of addition polymerization with a carbon-carbon double bond.

When the linear molecule is clathrated in a skewer shape by the cyclic molecules comprising a functional group capable of addition polymerization with a carbon-carbon double bond, if the maximum amount at which the cyclic molecule comprising a functional group capable of addition polymerization with a carbon-carbon double bond is skewered by the linear molecule is taken as 1, the cyclic molecule comprising a functional group capable of addition polymerization with a carbon-carbon double bond is skewed by the linear molecule in an amount of preferably 0.001 or more and 0.6 or less, more preferably 0.01 or more and 0.5 or less, further preferably 0.05 or more and 0.4 or less.

The linear molecule may be a molecule that can be clathrated in a skewer shape by the cyclic molecule comprising a functional group capable of addition polymerization with a carbon-carbon double bond.

Examples of the linear molecule include, for example, polyvinyl alcohol; polyvinyl pyrrolidone; poly (meth)acrylic acid; cellulose resins (carboxymethyl cellulose, hydroxyethyl cellulose, hydroxypropyl cellulose etc.); polyacrylamide, polyethylene oxide; polyethylene glycol; polypropylene glycol; polyvinyl acetal resin; polyvinyl methyl ether; polyamine; polyethylene imine; casein; gelatin; starch, etc.; and copolymers of the above-described polymers (resins).

Other examples of the linear molecule include, for example, polyolefin resins such as polyethylene, polypropylene, and copolymers with other olefin monomers, and the like; polyester resins; polyvinyl chloride resins; polystyrene resins such as polystyrene, acrylonitrile-styrene copolymer, and the like; (meth)acrylic resins such as polymethyl methacrylate, (meth)acrylic acid ester copolymer, acrylonitrile-methyl acrylate copolymer, and the like; polycarbonate resins; polyurethane resins; vinyl chloride-vinyl acetate copolymers; polyvinyl butyral resins; and additionally, derivatives or modified products of the above-described polymers (resins).

Still other examples of the linear molecule include, for example, polyisobutylene; polytetrahydrofuran; polyaniline; acrylonitrile-butadiene-styrene copolymer (ABS resin); polyamides such as nylon and the like; polyimides; polydienes such as polyisoprene, polybutadiene and the like; polysiloxanes such as polydimethylsiloxane and the like; polysulfones; polyimines; polyacetic anhydrides; polyureas; polysulfides;

polyphosphazenes; polyketones; polyphenylenes;

polyhaloolefins; and additionally, derivatives of the above-described polymers (resins), and the like.

The linear molecule is preferably polyethylene glycol, polypropylene glycol, polytetrahydrofuran, polydimethylsiloxane, polyethylene or polypropylene, more preferably polyethylene glycol.

The linear molecule may comprise the functional group capable of addition polymerization with a carbon-carbon double bond.

The weight-average molecular weight of the linear molecule is preferably 5000 or more and 500000 or less, more preferably 8000 or more and 100000 or less, and further more preferably 10000 or more and 100000 or less.

In some embodiments, the weight-average molecular weight of the linear molecule is preferably 21000 or more and 100000 or less, more preferably 25000 or more and 100000 or less.

By using a polyrotaxane compound comprising a linear molecule having a weight-average molecular weight in the above-described range, a molded article having more excellent impact resistance can be obtained. In addition, by appropriately selecting the weight-average molecular weight of the linear molecule, the transparency of a molded article can be improved.

The weight-average molecular weight of the linear molecule can be measured, for example, by using a linear molecule with a known molecular weight as a standard reagent in gel permeation chromatography (GPC), and creating a calibration curve from the elution time and the molecular weight. The linear molecule is used by dissolving it in a solvent, and an RI detector is used as a detector.

The blocking group is not particularly limited as long as it is disposed at the end of the linear molecule and can prevent elimination of the cyclic molecule comprising a functional group capable of addition polymerization with a carbon-carbon double bond.

Examples of the blocking group include dinitrophenyl groups (2,4-dinitrophenyl group, 3,5-dinitrophenyl group etc.), dialkylphenyl groups, groups comprising the structure of cyclodextrins, adamantane groups, trityl groups, groups comprising the structure of fluoresceins, groups comprising the structure of pyrenes, and groups comprising the structure of substituted benzenes (groups comprising the structure of alkylbenzene, alkyloxybenzene, phenol, halobenzene, cyanobenzene, benzoic acid, aminobenzene, etc.), groups comprising the structure of polynuclear aromatics which may be substituted, groups comprising the structure of steroids, groups comprising the structure of derivatives or modified products thereof, and the like.

The blocking group is preferably a dinitrophenyl group, a group comprising a cyclodextrin structure, an adamantane group, a trityl group, a group comprising a fluorescein structure or a group comprising a pyrene structure, more preferably an adamantane group.

(3) Method of Producing Polyrotaxane Compound

The method of producing a polyrotaxane compound includes, for example, (i) a method of reacting a polyrotaxane with a compound comprising a functional group capable of addition polymerization with a carbon-carbon double bond (hereinafter, referred to as compound X) in the presence of a basic compound or a catalyst, and (ii) a method of production using a cyclic molecule comprising a functional group capable of addition polymerization with a carbon-carbon double bond, according to methods described in Japanese Patent No. 3475252, International Publication WO2009/136618, Japanese Patent No. 3968414, etc.
and the like.

The cyclic molecule comprising a functional group capable of addition polymerization with a carbon-carbon double bond used in the above (ii) includes 1,3,5,7-tetravinyl-1,3,5,7-tetramethylcyclotetrasiloxane, compounds described in Japanese Patent No. 3968414, JP-A No. 6-299119 and International Publication WO2013/094421, and the like. These compounds can be produced by, for example, a method of reacting a crown ether precursor comprising a —$CH_2O$— skeleton such as 1,2-phenylenebis (oxyethylene oxyethylene)ditosylate with a dihydroxybenzene derivative comprising a functional group capable of addition polymerization with a carbon-carbon double bond in the presence of cesium carbonate; a method in which a dichlorosilane compound is reacted in the presence of an acid or a base; a method described in International Publication WO2013/094421; and the like.

As described above, the polyrotaxane used in the above (i) is a compound comprising a cyclic molecule A (a cyclic molecule comprising no functional group capable of addition polymerization with a carbon-carbon double bond), a linear molecule clathrated in a skewer shape by the cyclic molecule A, and blocking groups disposed at the ends of the linear molecule to prevent elimination of the cyclic molecule A. The basic structure is the same as in FIG. 1 except that the cyclic molecule comprises no functional group capable of addition polymerization with a carbon-carbon double bond.

Examples of the linear molecule and blocking groups of polyrotaxane are the same as the linear molecule and blocking groups in the polyrotaxane compound described above.

The cyclic molecule A includes cyclodextrins such as α-cyclodextrin, β-cyclodextrin, γ-cyclodextrin, dimethyl cyclodextrin, glucosyl cyclodextrin and their derivatives and the like; crown ethers capable of reacting with the compound X such as cyclofructan, a dibenzo-24-crown-8-ether derivative comprising a hydroxyl group, a dibenzo-24-crown-8-ether derivative comprising an isocyanate group and the like; cyclic siloxanes capable of reacting with the compound X such as cyclic siloxanes comprising a hydroxyl group, cyclic siloxanes comprising an isocyanate group, and the like.

The crown ethers and cyclic siloxanes which can react with the compound X include also compounds described in Japanese Patent No. 3968414 and JP-A No. 6-299119. The polyrotaxane may comprise one or more cyclic molecules A.

As the cyclic molecule A, α-cyclodextrin, β-cyclodextrin or γ-cyclodextrin is preferable, and α-cyclodextrin is more preferable.

The method of producing the polyrotaxane is disclosed, for example, in Japanese Patent No. 3475252, International Publication WO2009/136618 and the like.

Examples of the compound X used in the above (i) include compounds comprising at least one group selected from the group consisting of a vinyl group, an acryloyl group, and a methacryloyl group.

The compound X includes, more specifically, chlorides comprising at least one group selected from the group consisting of a vinyl group, an acryloyl group and a methacryloyl group, isocyanate compounds comprising at least one group selected from the group consisting of a vinyl group, an acryloyl group and a methacryloyl group, isothiocyanate compounds comprising at least one group selected from the group consisting of a vinyl group, an acryloyl group and a methacryloyl group, compounds comprising a hydroxyl group and at least one group selected from the group consisting of a vinyl group, an acryloyl and a methacryloyl group, and the like.

The chloride comprising at least one group selected from the group consisting of a vinyl group, an acryloyl group and a methacryloyl group includes 5-chloro-1-pentene, 4-chloro-1-butene, allyl chloride, acryloyl chloride, 2-chloroethyl acrylate, methacryloyl chloride, 2-chloroethyl methacrylate and the like.

The isocyanate compound comprising at least one group selected from the group consisting of a vinyl group, an acryloyl group and a methacryloyl group includes 4-cyano-1-butene, allyl isocyanate, 2-acryloyloxyethyl isocyanate, 2-acryloyloxyisopropyl isocyanate, 2-methacryloyloxyethyl isocyanate, 2-methacryloyloxyethyl isopropyl isocyanate, 2-(2'-methacryloyloxyethyl)oxyethyl isocyanate and the like.

The isothiocyanate compound comprising at least one group selected from the group consisting of a vinyl group, an acryloyl group and a methacryloyl group includes 4-isothiocyana-1-butene, allyl isothiocyanate, 2-acryloyloxyethyl isothiocyanate, 2-acryloyloxyisopropyl isothiocyanate, 2-methacryloyloxyethyl isothiocyanate, 2-methacryloyloxyisopropyl isothiocyanate, 2-(2'-methacryloyloxyethyl)oxyethyl isothiocyanate and the like.

The compound comprising a hydroxyl group and at least one group selected from the group consisting of a vinyl group, an acryloyl group and a methacryloyl group includes 4-hydroxybutyl vinyl ether, 4-penten-1-ol, 3-buten-1-ol, allyl alcohol, 2-hydroxymethyl acrylate, 2-hydroxyethyl acrylate, 2-hydroxypropyl acrylate, 2-hydroxymethyl methacrylate, 2-hydroxyethyl methacrylate, 2-hydroxypropyl methacrylate and the like.

The compound X is preferably a chloride comprising an acryloyl group, an isocyanate compound comprising an acryloyl group, an isothiocyanate compound comprising an acryloyl group, a compound comprising an acryloyl group and a hydroxyl group, a chloride comprising a methacryloyl group, an isocyanate comprising a methacryloyl group, an isothiocyanate compound comprising a methacryloyl group, or a compound comprising a methacryloyl group and a hydroxyl group, and more preferably an isocyanate compound comprising a methacryloyl group.

Examples of the basic compound used in the above (i) include triethylamine, pyridine, N,N-dimethyl-4-aminopyridine and the like.

Examples of the catalyst used in the above (i) include dibutyltin dilaurate, tin octylate, bismuth octylate, zinc octylate, lead octylate, bismuth decanoate, triethylamine, triethylenediamine, N,N,N',N'-tetramethyl ethylenediamine and the like.

In the above method (i), if necessary, a compound that reacts with both the polyrotaxane and the compound X (hereinafter, referred to as compound Y) may be used. That is, the product obtained by reacting the polyrotaxane with the compound Y may be reacted with the compound X to produce the polyrotaxane compound.

As the compound Y, a compound comprising two or more isocyanate groups, a compound comprising two or more isothiocyanate groups, lactone, oxacycloalkane and the like are mentioned. The compound Y may be used alone or in combination of two or more.

Examples of the compound comprising two or more isocyanate groups include aliphatic isocyanates, alicyclic isocyanates, araliphatic isocyanates, aromatic isocyanates and the like. The compound comprising two or more isocyanate groups may be used alone or in combination of two or more.

Examples of the aliphatic isocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanates, 2,4,4- or 2,2,4-trimethylhexamethylene diisocyanate, dimer acid diisocyanate, methyl 2,6-diisocyanatohexanoate (conventional name: lysine diisocyanate) and the like; aliphatic trisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane, etc.; and the like. The aliphatic isocyanate may be used alone or in combination of two or more.

Examples of the alicyclic isocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (conventional name: isophorone diisocyanate), 4-methyl-1, 3-cyclohexylene diisocyanate (conventional name: hydrogenated TDI), 2-methyl-1,3-cyclohexylene diisocyanate, 1,3- or 1,4-bis (isocyanatomethyl) cyclohexane (conventional name: hydrogenated xylylene diisocyanate) or a mixture thereof, methylene bis (4,1-cyclohexanediyl) diisocyanate (conventional name: hydrogenated MDI), norbornane diisocyanate, and the like; alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di (isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopro pyl)-bicyclo(2.2.1)heptane, 6-(2-isocyanatoethyl)-2-isocyanatomethyl-3-(3-isocyanatopro pyl)-bicyclo(2.2.1)heptane, 5-(2-isocyanatoethyl)-2-isocyanatomethyl-2-(3-isocyanatopro pyl)-bicyclo(2.2.1)-heptane, 6-(2-isocyanatoethyl)-2-isocyanatomethyl-2-(3-isocyanatopro pyl)-bicyclo(2.2.1)heptane and the like. The alicyclic isocyanate may be used alone or in combination of two or more.

Examples of the araliphatic isocyanate include araliphatic diisocyanates such as methylenebis (4,1-phenylene) diisocyanate (common name: MDI), 1,3 or 1,4-xylylene diisocyanate or a mixture thereof, ω, ω'-diisocyanato-1,4-diethylbenzene, 1,3- or 1,4-bis(1-isocyanato-1-methylethyl) benzene (common name: tetramethyl xylylene diisocyanate) or mixtures thereof and the like; araliphatic triisocyanates such as 1,3,5-triisocyanatomethylbenzene and the like. The araliphatic isocyanate may be used alone or in combination of two or more.

Examples of the aromatic isocyanate include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or a mixtures thereof, 4,4'-toluidine diisocyanate, 4,4'-diphenyl ether diisocyanate and the like; aromatic triisocyanates such as triphenylmethane-4,4',4"-triisocyanate, 1,3,5-isocyanatobenzene, 2,4,6-triisocyanatotoluene and the like; aromatic tetraisocyanates such as 4,4'-diphenylmethane-2,2',5,5'-tetraisocyanate and the like. The aromatic isocyanate may be used alone or in combination of two or more.

Examples of the compound comprising two or more isothiocyanate groups include monomethylene diisothiocyanate, dimethylene diisothiocyanate, trimethylene diisothiocyanate, tetramethylene diisothiocyanate, pentamethylene diisothiocyanate, hexamethylene diisothiocyanate, toluene diisothiocyanate, xylene diisothiocyanate, tolylene diisothiocyanate, 1,3-bis(isothiocyanatomethyl)cyclohexane and the like. The compound comprising two or more isothiocyanate groups may be used alone or in combination of two or more. The compound comprising two or more isothiocyanate groups and the compound comprising two or more isocyanate groups may be used in combination.

As the lactone, α-acetolactone, β-propiolactone, γ-butyrolactone, ε-caprolactone and the like are mentioned.

As the oxacycloalkane, oxacyclopropane, oxacyclobutane, oxacyclohexane and the like are mentioned.

By reacting a polyrotaxane and the compound X, and the compound as needed, the cyclic molecule A and the compound X, and the compound Y as needed can react to obtain a cyclic molecule comprising a functional group capable of addition polymerization with a carbon-carbon double bond. For example, when a polyrotaxane in which the cyclic molecule A is cyclodextrins is used, the cyclodextrins and the compound X (as needed, the compound Y) can react to obtain cyclodextrins comprising a functional group capable of addition polymerization with a carbon-carbon double bond.

In addition, when a polyrotaxane compound comprising a compound comprising a hydroxyl group as a linear molecule is used, the compound X (as needed, the compound Y) reacts not only with the cyclic molecule A but also with the linear molecule. Thus, it is possible to obtain a polyrotaxane compound comprising a cyclic molecule comprising a functional group capable of addition polymerization with a carbon-carbon double bond and a linear molecule comprising a functional group capable of addition polymerization with a carbon-carbon double bond.

In a polyrotaxane compound comprising cyclodextrins comprising a functional group capable of addition polymerization with a carbon-carbon double bond as a cyclic molecule comprising a functional group capable of addition polymerization with a carbon-carbon double bond, the number of the functional group capable of addition polymerization with a carbon-carbon double bond is preferably 1% or more and 60% or less, more preferably 4% or more and 20% or less, with respect to 100% of the number of hydrogen atoms of hydroxyl groups contained in the polyrotaxane comprising cyclodextrins.

If the number of the functional group is excessively small, the reaction with the monomer comprising a carbon-carbon double bond at the end does not proceed sufficiently, which may possibly impair the transparency of the molded article. In addition, when the number of the functional group is excessively large, the appearance of the molded article may possibly be deteriorated.

The number of hydrogen atoms of hydroxyl groups contained in the polyrotaxane comprising cyclodextrins (that is, the hydroxyl value) can be measured based on JIS K 0070.

Even in the case where the cyclic molecule is other than cyclodextrins, the number of the functional group capable of addition polymerization with a carbon-carbon double bond in the polyrotaxane compound is preferably within the above range.

(4) Resin P

The resin P is a resin comprising a structural unit derived from a monomer comprising a carbon-carbon double bond at the end and a structural unit derived from a polyrotaxane compound.

The content of the structural unit derived from the polyrotaxane compound in the resin P is preferably 3% by mass or more, more preferably 5% by mass or more and 50% by mass or less, further preferably 10% by mass or more and 50% by mass or less, with respect to 100% by mass of the total of a structural unit derived from a monomer comprising a carbon-carbon double bond at the end and the structural unit derived from the polyrotaxane compound.

In contrast, the content of a structural unit derived from a monomer comprising a carbon-carbon double bond at the end in the resin P is preferably 97% by mass or less, more preferably 50% by mass or more and 95% by mass or less, further preferably 50% by mass or more and 90% by mass or less, with respect to 100% by mass of the total of a structural unit derived from a monomer comprising a carbon-carbon double bond at the end and the structural unit derived from the polyrotaxane compound.

By using the resin P in which the content of the structural unit derived from the monomer comprising a carbon-carbon double bond at the end and the content of the structural unit derived from the polyrotaxane compound are in the above ranges, a molded article having excellent impact resistance can be obtained without impairing the transparency.

The resin P can be produced by polymerizing a monomer comprising a carbon-carbon double bond at an end and a polyrotaxane compound by polymerization by irradiation with light or polymerization using a polymerization initiator.

The polymerization initiator includes azo initiators (e.g., 2,2'-azobisisobutyronitrile, 2,2'-azobis(2,4-dimethylvaleronitrile), etc.), peroxide initiators (lauroyl peroxide, benzoyl peroxide, etc.), redox initiators in which organic peroxides and amines are combined, and the like. In production of the resin P, the type of an appropriate polymerization method (light irradiation, heating, etc.) or an appropriate polymerization initiator is selected depending on the monomer comprising a carbon-carbon double bond at the end used so as to obtain a molded article having excellent transparency.

When the above-described polymerization initiator is used at the time of polymerization, the amount of the polymerization initiator used is preferably 0.01 part by mass or more and 1 part by mass or less, more preferably 0.01 part by mass or more and 0.5 parts by mass or less with respect to 100 parts by mass of the total of the above-described monomer comprising a carbon-carbon double bond at the end and the above-described polyrotaxane compound used in polymerization.

The resin P is usually an amorphous resin. The glass transition temperature of the resin P is, for example, 100° C. or more and 150° C. or less, and preferably 110° C. or more and 130° C. or less from the viewpoint of the impact resistance of the molded article.

The thermal decomposition temperature of the resin P is, for example, 260° C. or more, and preferably 280° C. or more from the viewpoint of the heat resistance of the molded article.

Hereinafter, the glass transition temperature of the resin P is also referred to as the glass transition temperature Tgb.

The glass transition temperature Tgb of the resin P is a midpoint glass transition temperature determined by DSC (differential scanning calorimetry) based on JIS K 7121.

The thermal decomposition temperature of the resin P is a primary initiation temperature determined by TGA (thermogravimetric measurement) based on JIS K 7120.

(5) Molded Article

The molded article according to the present invention comprises the resin P, and can be excellent in transparency and impact resistance.

From the viewpoint of impact resistance, the molded article preferably comprises 50% by mass or more, more preferably 70% by mass or more, and furthermore preferably 90% by mass or more of the resin P. Most preferably, the molded article is made of resin P (content of resin P: 100% by mass). The content of the resin P in the molded article may be less than 100% by mass, 95% by mass or less, or 90% by mass or less.

The molded article according to the present invention may comprise known additives as long as the effects of the present invention are not impaired.

Examples of the additive include ultraviolet absorbers (hindered amine compounds and the like) for improving the weather resistance, antioxidants (phenolic compounds, phosphorus compounds and the like) for preventing discoloration and yellowing, chain transfer agents (linear or branched alkyl mercaptan compounds such as methyl mercaptan, n-butyl mercaptan, t-butyl mercaptan, etc.) for control of molecular weight, and flame retardants for imparting flame retardancy, colorants, and the like.

The molded article according to the present invention has a Hermann's degree of orientation f of 0.006 or more. Thereby, the molded article which is excellent in impact resistance can be provided.

From the viewpoint of impact resistance, the molded article according to the present invention preferably has a Herman's degree of orientation f of 0.008 or more, more preferably 0.010 or more.

The molded article according to the present invention usually has a Herman's degree of orientation f of 1.0 or less, and from the viewpoint of dimensional stability of the molded article, preferably from 0.6 or less, more preferably 0.2 or less.

The Hermann's degree of orientation f of the molded article according to the present invention is preferably 0.006 or more and 1.0 or less, more preferably 0.008 or more and 0.6 or less, further preferably 0.010 or more and 0.2 or less.

For example, a Hermann's degree of orientation f of 0.006 or more can be imparted to the molded article by a stretching treatment under specific conditions.

The Hermann's degree of orientation f is determined by the following method.

The Hermann's degree of orientation f is determined by wide-angle X-ray diffraction (WAXD). A rectangular plate with the long side as the direction (MD) in which the ratio of the size after molding to the size before molding is largest and the short side as the direction (ND) in which the ratio of the size after molding to the size before molding is smallest is cut out from the molded article and used as a sample for measurement. The thickness of the obtained measurement sample is about 1 mm.

Using the following X-ray diffractometer, one plane having the long side of MD and the short side of ND of the measurement sample was irradiated with X-ray under the following X-ray output conditions from the direction perpendicular to the plane having the long side of MD and the short side of ND of the resultant measurement sample, and imaging of the diffraction image by a transmission method and measurement of the transmitted light intensity $A_S$ of the direct beam are performed.

X-ray diffractometer: "NANO-Viewer" manufactured by Rigaku Corporation

X-ray output conditions: Cu target, 40 kV, 20 mA

An uncorrected azimuth angle distribution curve (azimuth angle ($\varphi$)-intensity distribution curve) IS ($\varphi$) is calculated, by determining the average intensity in the range of 2θ=12.6 to 14.2° for the peak around the diffraction angle 2θ=13.4°, from the resulted diffraction image. The uncorrected azimuth angle distribution curve refers to an azimuth angle distribution curve before the background correction is performed. The measurement is performed under the same conditions except that the obtained measurement sample is removed from the optical axis of the X-ray, and calculation of the azimuth angle distribution curve $I_B$ ($\varphi$) of the background and measurement of the transmitted light intensity AB of the direct beam are performed. After performing transmittance correction based on the following formula (3), the background is removed from the above uncorrected azimuth angle distribution curve, to obtain the azimuth angle distribution curve after background correction (hereinafter, simply referred to as "azimuth angle distribution curve) I ($\varphi$).

[Chemical Formula 2]

$$I(\phi) = \frac{I_S(\phi)}{A_S} - \frac{I_B(\phi)}{A_B} \qquad \text{formula (3)}$$

The peak in the azimuth angle distribution curve is an orientation peak, and in this measurement, MD of the measurement sample is placed in the vertical direction, and the azimuth angle at the maximum intensity of the orientation peak appearing in the horizontal direction is taken as 0 radian. The azimuth angles (0 radian and π radian) at the maximum intensity of the orientation peak are derived from components oriented in the MD. The Hermann's degree of orientation f is determined according to the following formula (1) and the following formula (2) from the obtained azimuth angle distribution curve.

[Chemical Formula 3]

$$f = \frac{3\langle\cos^2\phi\rangle - 1}{2} \qquad \text{formula (1)}$$

$$\langle\cos^2\phi\rangle = \frac{\int_0^{\pi/2} I(\phi)\cos^2\phi \sin\phi \, d\phi}{\int_0^{\pi/2} I(\phi)\sin\phi \, d\phi} \qquad \text{formula (2)}$$

wherein I ($\varphi$) represents the luminance at the azimuth angle $\varphi$ in the azimuth angle distribution curve obtained by wide-angle X-ray diffraction measurement.

The Herman's degree of orientation f of the molded article can be adjusted by changing the stretch ratio, the stretching temperature, the stretching speed, the cooling speed after stretching, and the composition of the resin for forming the molded article, in the stretching step described later.

For example, the Hermann's degree of orientation f tends to increase as the stretching speed increases, and the Herman's degree of orientation f tends to increase as the stretching temperature decreases. Moreover, when producing a molded article by press stretching, the Hermann's degree of orientation f tends to increase as the stretch ratio in the thickness direction increases, and the Herman's degree of orientation f tends to increase as the cooling rate increases in the cooling step after stretching.

The molded article according to the present invention has a haze of less than 10% measured at a thickness of 3 mm. Thereby, the molded article which is excellent in transparency can be provided.

From the viewpoint of transparency, the molded article according to the present invention preferably has a haze of 6% or less, more preferably 4% or less.

The molded article according to the present invention may have a haze of 0.01% or more or 0.1% or more.

The haze of the molded article is measured by using a haze meter in accordance with JIS K 7136, with light being incident on the molded article.

The shape of the molded article according to the present invention is not particularly limited, and examples thereof include a plate, a sheet, a film, a shape of the product itself, and a shape of the component itself used for the product.

The molded article according to the present invention may be processed to obtain a desired product or part (member).

In one embodiment, the above-described molded article is a plate, a sheet or a film. The width and length of the plate, sheet or film are not particularly limited. The plate, sheet or film is, for example, a long product or a roll thereof. The thickness of the plate, sheet or film is, for example, 10 μm or more and 50 mm or less, and may be 0.1 mm or more and 10 mm or less or 0.5 mm or more and 4 mm or less.

The molded article according to the present invention may be a plate fragment, sheet fragment or film fragment cut from the plate, sheet or film.

Various resin products or resin parts can be produced using the molded article according to the present invention. Examples of resin products or resin parts include automotive materials, display window protection plates and the like.

Examples of the automotive material include rear lamp covers, and windows for automobiles such as front glass, side glass, and rear glass.

The display window protection plate is used for an electronic device comprising a window (display) for displaying character information, image information and the like, and protects the window (display). The electronic device includes a mobile phone, a smartphone, a personal computer, a tablet, a digital camera, a video camera, a portable game, a portable audio player, and the like.

Resin products or resin parts such as automotive materials and display window protective plates can be produced by cutting the plate, sheet or film, which is the molded article according to the present invention, into a desired shape and size, alternatively by further processing (for example, shape adjustment and the like).

<Method of Producing Molded Article>

The method of producing a molded article according to the present invention comprises a step of stretching the resin P at a temperature not lower than 30° C. lower than the glass transition temperature of the resin P and lower than the thermal decomposition temperature of the resin P.

The method of producing a molded article according to the present invention is suitable as a method of producing the molded article according to the present invention.

In the first embodiment, the method of producing a molded article comprises a step of polymerizing a monomer comprising a carbon-carbon double bond at the end and a polyrotaxane compound to produce a resin P, a step of heating the resultant resin P at a temperature not lower than the glass transition temperature of the resin P, and a step of stretching the heated resin P at a temperature not lower than 30° C. lower than the glass transition temperature of the resin P and not higher than the thermal decomposition temperature of the resin P.

The method of polymerizing a monomer comprising a carbon-carbon double bond at the end and a polyrotaxane compound includes, for example, a liquid injection polymerization method (cast polymerization method) using a glass cell, and the like.

The method of producing a molded article may further comprise a step of cooling the molded article (stretched molded article) obtained in the stretching step to a temperature lower than the temperature at the time of the stretching step and lower than the glass transition temperature of the resin P under a state where the load at the stretching is applied.

The method of producing a molded article may further comprise a step of mixing or kneading the resin P and resins other than the resin P and other compounding components such as the above-mentioned additives, before the heating step or while performing the heating step.

When the molded article comprises the resin P and a resin other than the resin P, the glass transition temperature of the resin P and the thermal decomposition temperature of the resin P can be read as the glass transition temperature of the mixed or kneaded product of the resins P and resins other than the resin P or the thermal decomposition temperature of the mixed or kneaded product of the resin P and resins other than the resin P, respectively.

In the second embodiment, the method of producing a molded article comprises a step of polymerizing a monomer comprising a carbon-carbon double bond at the end and a polyrotaxane compound to produce a resin P, a step of molding the resultant resin P to produce an unstretched molded article, a step of heating the resultant unstretched molded article at a temperature not lower than the glass transition temperature of the resin P and a step of stretching the heated unstretched molded article at a temperature not lower than 30° C. lower than the glass transition temperature of the resin P and not higher than the thermal decomposition temperature of the resin P.

Examples of the method of polymerizing a monomer comprising a carbon-carbon double bond at the end and a polyrotaxane compound include an emulsion polymerization method, a suspension polymerization method, a bulk polymerization method and the like.

Examples of the molding method for producing an unstretched molded article include an extrusion molding method, an injection molding method, a hot plate press molding method and the like.

The shape of the unstretched molded article is not particularly limited, but is preferably plate, sheet or film.

The method of producing a molded article may further comprise a step of cooling the molded article (stretched molded article) obtained in the stretching step to a temperature lower than the temperature at the time of the stretching step and lower than the glass transition temperature of the resin P under a state where the load at the stretching is applied.

The method of producing a molded article may further comprise a step of mixing or kneading the resin P and resins other than the resin P and other compounding components such as the above-mentioned additives, before the step of producing an unstretched molded article.

When the molded article comprises the resin P and a resin other than the resin P, the glass transition temperature of the resin P and the thermal decomposition temperature of the resin P can be read as the glass transition temperature of the mixed or kneaded product of the resins P and resins other than the resin P or the thermal decomposition temperature of the mixed or kneaded product of the resin P and resins other than the resin P, respectively.

A molded article having excellent impact resistance, in which the Hermann's degree of orientation f is 0.006 or more, can be obtained by a production method comprising a step of stretching under specific temperature conditions like the production methods according to the first and second embodiments described above.

The stretching temperature in the stretching step is a temperature not lower than 30° C. lower than the glass transition temperature of the resin P and lower than the thermal decomposition temperature of the resin P.

The stretching temperature refers to the temperature of the mold (die temperature) in the stretching step or the temperature in the stretching tank.

When the glass transition temperature of the resin P is Tgb (° C.), the stretching temperature is preferably (Tgb−30)° C. or more and (Tgb+90)° C. or less, more preferably (Tgb−25)° C. or more and (Tgb+80)° C. or less, further preferably (Tgb−20)° C. or more and (Tgb+60)° C. or less, still more preferably (Tgb−15)° C. or more and (Tgb+40)° C. or less, particularly preferably (Tgb−10)° C. or more and (Tgb+30)° C. or less. If the stretching temperature is excessively low, the whitening may occur and the appearance of the molded article may be deteriorated, and a crack may occur to deteriorate the appearance of the molded article, while if the temperature at the time of stretching is high, the resin P is not sufficiently oriented, and there is a possibility that the Hermann's degree of orientation f does not become 0.006 or more, and there is a possibility that a molded article having more excellent impact resistance is not obtained.

In one preferred embodiment from the viewpoint of the transparency and impact resistance of the molded article, the stretching temperature is higher than Tgb, preferably (Tgb+10) ° C. or higher, or (Tgb+20) ° C. or higher. In this preferred embodiment, the stretching temperature is not higher than the thermal decomposition temperature of the resin P, preferably not higher than (Tgb+90) ° C., more preferably not higher than (Tgb+80) ° C., further preferably not higher than (Tgb+60) ° C., still more preferably not higher than (Tgb+40) ° C., particularly preferably not higher than (Tgb+30)° C.

In one preferred embodiment from the viewpoint of the transparency and impact resistance of the molded article, the stretching temperature is a temperature exceeding 80° C., preferably 90° C. or more, more preferably 95° C. or more, further preferably 100° C. or more. In this preferred embodiment, the stretching temperature is lower than the thermal decomposition temperature of the resin P, preferably (Tgb+90)° C. or less, more preferably (Tgb+80) ° C. or less, further preferably (Tgb+60)° C. or less, still more preferably (Tgb+40)° C. or less, particularly preferably (Tgb+30)° C. or less.

Examples of the stretching method in the stretching step include uniaxial stretching methods such as free-width uniaxial stretching, constant-width uniaxial stretching and the like, biaxial stretching methods such as sequential biaxial stretching, simultaneous biaxial stretching and the like, and a press stretching method of stretching while applying pressure, and the like. Among them, a biaxial stretching method or a press stretching method is preferable, and a press stretching method is more preferable because the resin P can be stretched uniformly.

The pressure at the time of stretching in the stretching step is not particularly limited, and varies depending on the apparatus to be used or the area of the resin P to be stretched (or unstretched molded article), and in the case of press stretching, for example, the pressure applied to the 80 mm×80 mm square resin P (or the unstretched molded article) is preferably 0.1 MPa or more and 1000 MPa or less. When the pressure at the time of stretching is too small, there is a possibility that the film cannot be stretched to a desired thickness.

The stretching speed in the stretching step is not particularly limited, but in the case of press stretching, for example, the speed at which the thickness of the resin P (or unstretched molded article) changes at a speed of 0.01 mm/sec or more and 100 mm/sec or less. The stretching speed may be varied or constant. If the stretching speed is too fast, the appearance of the resulting molded article may be deteriorated, and if the stretching speed is too slow, the orientation may be easily relaxed and the Hermann's degree of orientation f may not be 0.006 or more, and there is a possibility that it is difficult to obtain a molded article having excellent impact resistance.

The stretching ratio in the thickness direction in the stretching step is preferably 1.2 times or more and 10 times or less, more preferably 1.3 times or more and 7 times or less, further preferably 1.3 times or more and 6 times or less, in order to impart sufficient impact resistance to the molded article.

When the stretch ratio in the thickness direction is too large, the appearance of the resulting molded article may be deteriorated and the dimensional stability may be deteriorated.

The stretching ratio in the thickness direction is the thickness before stretching (that is, the thickness of the resin or the unstretched molded article)/the thickness of the molded article after stretching. When the stretch ratio is small, the Herman's degree of orientation f may not be 0.006 or more, and it may be difficult to obtain a molded article having excellent impact resistance.

The thickness direction is a direction indicating the thickness of an object to be stretched, and is usually a direction perpendicular to the widest surface of the object. For example, in the press stretching method, the direction in which pressure is applied is the thickness direction, and in the uniaxial stretching method or the biaxial stretching method, the direction perpendicular to the tensile direction is the thickness direction.

The cooling rate in the cooling step is not particularly limited, but the orientation by stretching tends to remain as the cooling rate increases, and the Herman's degree of orientation f tends to become 0.006 or more, and a molded article having more excellent impact resistance is obtained easily. The temperature after cooling is preferably lower than the stretching temperature, and more preferably lower than the stretching temperature and lower than Tgb. As the temperature after cooling is lower, the orientation by stretching tends to remain, the Herman's degree of orientation f tends to be 0.006 or more, and a molded article having more excellent impact resistance is easily obtained.

EXAMPLES

Hereinafter, the present invention will be specifically described by way of examples and comparative examples, but the present invention is not limited to these examples.

The glass transition temperature and thermal decomposition temperature of the resin, the Herman's degree of orientation f of the molded article, the transparency and the impact resistance were measured and evaluated according to the following methods.

(1) Glass Transition Temperature of Resin

The midpoint glass transition temperature was measured using DSC (differential scanning calorimetry) based on JIS K 7121, and this was used as the glass transition temperature.

(2) Thermal Decomposition Temperature of Resin

Based on JIS K 7120, the primary initiation temperature was measured by TGA (thermogravimetric measurement) using dry air as the inflow gas, and this was used as the thermal decomposition temperature.

(3) Herman's Degree of Orientation f of Molded Article

The Herman's degree of orientation f was determined by wide-angle X-ray diffraction (WAXD) for the obtained molded article. A rectangular plate with the long side as the direction (MD) in which the ratio of the size after molding to the size before molding is largest and the short side as the direction (ND) in which the ratio of the size after molding to the size before molding is smallest was cut out from the molded article and used as a measurement sample. The thickness of the obtained measurement sample was about 1 mm.

Using the following X-ray diffractometer, one plane having the long side of MD and the short side of ND of the measurement sample was irradiated with X-ray under the following X-ray output conditions from the direction perpendicular to the plane having the long side of MD and the short side of ND of the resultant measurement sample, and imaging of the diffraction image by a transmission method and measurement of the transmitted light intensity $A_s$ of the direct beam were performed.

X-ray diffractometer: "NANO-Viewer" manufactured by Rigaku Corporation

X-ray output conditions: Cu target, 40 kV, 20 mA

An uncorrected azimuth angle distribution curve (azimuth angle ($\varphi$)-intensity distribution curve) $I_S$ ($\varphi$) was calculated, by determining the average intensity in the range of 2 θ=12.6 to 14.2° for the peak around the diffraction angle 2 θ=13.4°, from the resulted diffraction image. The uncorrected azimuth angle distribution curve refers to an azimuth angle distribution curve before the background correction was performed. The measurement was performed under the same conditions except that the obtained measurement sample was removed from the optical axis of the X-ray, and calculation of the azimuth angle distribution curve $I_B$ ($\varphi$) of the background and measurement of the transmitted light intensity $A_B$ of the direct beam were performed. After performing transmittance correction based on the following formula (3), the background was removed from the above uncorrected azimuth angle distribution curve, to obtain the azimuth angle distribution curve after background correction (hereinafter, simply referred to as "azimuth angle distribution curve") I ($\varphi$).

[Chemical Formula 4]

$$I(\phi) = \frac{I_S(\phi)}{A_S} - \frac{I_B(\phi)}{A_B} \quad \text{formula (3)}$$

The peak in the azimuth angle distribution curve is an orientation peak, and in this measurement, MD of the measurement sample was placed in the vertical direction, and the azimuth angle at the maximum intensity of the orientation peak appearing in the horizontal direction was taken as 0 radian. The azimuth angles (0 radian and π radian) at the maximum intensity of the orientation peak were derived from components oriented in the MD. The Hermann's degree of orientation f was determined according to the following formula (1) and the following formula (2) from the obtained azimuth angle distribution curve.

[Chemical Formula 5]

$$f = \frac{3\langle\cos^2\phi\rangle - 1}{2} \quad \text{formula (1)}$$

$$\langle\cos^2\phi\rangle = \frac{\int_0^{\pi/2} I(\phi)\cos^2\phi \sin\phi \, d\phi}{\int_0^{\pi/2} I(\phi)\sin\phi \, d\phi} \quad \text{formula (2)}$$

wherein I ($\varphi$) represents the luminance at the azimuth angle $\varphi$ in the azimuth angle distribution curve obtained by wide-angle X-ray diffraction measurement.

(4) Transparency of Molded Article

A test piece of 50 mm wide×50 mm long and 3 mm thick was cut out from the obtained molded article, light was made incident, the haze was measured using a haze meter in accordance with JIS K 7136, and the transparency of the molded article was evaluated.

Moreover, the transparency of the molded article was also evaluated by the presence or absence of white turbidity by visual observation.

(5) Impact Resistance of Molded Article

Based on JIS K 7111, five no-notch test pieces having a size of 10 mm wide×8 mm long×3 mm thick were cut out from the obtained molded article, and a test in which flat-wise impact was applied was performed on each test piece.

The case where all the test pieces out of five were broken was evaluated as B, and the case where one or more test pieces were not broken was evaluated as A.

Example 1

(1) Production of Polyrotaxane Compound

Three hundred forty grams (340 g) of "SeRM (registered trademark) Super Polymer SH3400P (manufactured by Advanced Soft Material Co., Ltd.)" having a weight-average molecular weight of 700,000 obtained by reacting ε-caprolactone with a polyrotaxane comprising α-cyclodextrin, polyethylene glycol (PEG) having a weight-average molecular weight of 35,000 and adamantane groups was dissolved at room temperature in 1300 mL of dehydrated methyl methacrylate. Methacryloyloxyethyl isocyanate (6.8 mL) was added, and dibutyltin dilaurate as a catalyst was added in an amount of 1 part by mass with respect to 100 parts by mass of methacryloyloxyethyl isocyanate. Then, the mixture was stirred at 80° C. for 12 hours, to obtain a polyrotaxane compound.

In the obtained polyrotaxane compound, the number of functional groups capable of addition polymerization with a carbon-carbon double bond was 11.1% with respect to 100% of the number of hydrogen atoms of hydroxyl groups contained in the polyrotaxane.

(2) Production of Resin

Ten (10) parts by mass of the polyrotaxane compound obtained in the above (1), 89.9 parts by mass of methyl methacrylate, and 0.1 part by mass of 2,2'-azobisisobutyronitrile were added and mixed. Next, the obtained mixture was poured into a cell having a gap clearance of 4 mm constituted of two glass plates and a soft polyvinyl chloride gasket, and the mixture was polymerized by heating in a polymerization tank using air as a heat medium at 60° C. for 5 hours, then, at 120° C. for 40 minutes, to obtain a plate-like resin having a thickness of 4 mm. The glass transition temperature of the resin was 113° C. The thermal decomposition temperature of the resin was 200° C. or higher. When the transparency of the resin was visually confirmed, it was transparent.

(3) Production of Molded Article by Stretching

The resin obtained in the above (2) was cut into a size of 80 mm×80 mm (thickness 4 mm), and heated in a thermostat at 140° C. for 40 minutes. Next, it was press-stretched to a thickness of 3 mm using a press (single-acting compression molding machine NSF-70 type manufactured by Shinto Metal Industries, Ltd.; clamping pressure: 70 tons) in which the die was heated to 140° C. Immediately after stretching, water was passed through the die of the press to cool the die, and a molded article was obtained by cooling down to 50° C. over approximately 6 minutes while applying pressure.

The stretching ratio in the thickness direction in the stretching step was 1.3. In addition, the stretch ratio in the thickness direction is a value calculated by the thickness before press-stretching/the thickness after press-stretching of a plate-like resin. When the transparency of the molded article was visually confirmed, it was transparent.

The Herman's degree of orientation f, haze and impact resistance of the resulting molded article were measured and evaluated. The results are shown in Table 1.

Example 2

A molded article was obtained in the same manner as in Example 1, except that a plate-like resin with a thickness of 6 mm was obtained by setting the clearance of the gap constituted of the two glass plates and the soft polyvinyl chloride gasket to 6 mm, then, the stretching step was carried out with the stretch ratio in the thickness direction increased to 2.0 times.

When the transparency of the resin was visually confirmed, it was transparent. When the transparency of the molded article was visually confirmed, it was transparent.

The Herman's degree of orientation f, haze and impact resistance of the resulting molded article were measured and evaluated. The results are shown in Table 1.

Example 3

A molded article was obtained in the same manner as in Example 1, except that a plate-like resin with a thickness of 8 mm was obtained by setting the clearance of the gap constituted of the two glass plates and the soft polyvinyl chloride gasket to 8 mm, then, the stretching step was carried out with the stretch ratio in the thickness direction increased to 2.7 times.

When the transparency of the resin was visually confirmed, it was transparent. When the transparency of the molded article was visually confirmed, it was transparent.

The Herman's degree of orientation f, haze and impact resistance of the resulting molded article were measured and evaluated. The results are shown in Table 1.

Example 4

A molded article was obtained in the same manner as in Example 3, except that the thermostat temperature was 100° C. and the die temperature was 100° C. in the stretching step.

The Herman's degree of orientation f, haze and impact resistance of the resulting molded article were measured and evaluated. The results are shown in Table 1.

Example 5

A molded article was obtained in the same manner as in Example 1, except that a plate-like resin with a thickness of 8 mm was obtained by setting the clearance of the gap constituted of the two glass plates and the soft polyvinyl chloride gasket to 8 mm, then, three sheets of the plate-like resin were stacked and the resultant resin laminate was subjected to the stretching step with the stretch ratio in the thickness direction increased to 8.0 times.

The Herman's degree of orientation f, haze and impact resistance of the resulting molded article were measured and evaluated. The results are shown in Table 1.

Comparative Example 1

A molded article was obtained in the same manner as in Example 2, except that the polyrotaxane compound was not added, and 99.9 parts by mass of methyl methacrylate and 0.1 part by mass of 2,2'-azobisisobutyronitrile were used.

When the transparency of the resin was visually confirmed, it was transparent. When the transparency of the molded article was visually confirmed, it was transparent.

The Herman's degree of orientation f, transparency and impact resistance of the obtained molded article were measured and evaluated. The results are shown in Table 1.

Comparative Example 2

A molded article was obtained in the same manner as in Comparative Example 1, except that a plate-like resin with a thickness of 8 mm was obtained by setting the clearance of the gap constituted of the two glass plates and the soft polyvinyl chloride gasket to 8 mm, then, the stretching step was carried out with the stretch ratio in the thickness direction increased to 2.7 times.

When the transparency of the resin was visually confirmed, it was transparent. When the transparency of the molded article was visually confirmed, it was transparent.

The Herman's degree of orientation f, haze and impact resistance of the resulting molded article were measured and evaluated. The results are shown in Table 1.

Comparative Example 3

A molded article was obtained in the same manner as in Example 1, except that 10 parts by mass of the above-described SeRM (registered trademark) Super Polymer SH3400P was used instead of 10 parts by mass of the polyrotaxane compound in resin production, and a plate-like resin with a thickness of 6 mm was obtained by setting the clearance of the gap constituted of the two glass plates and the soft polyvinyl chloride gasket to 6 mm, then, the stretching step was carried out with the stretch ratio in the thickness direction increased to 2.0 times.

The resultant resin and the molded article were opaque.

Comparative Example 4

A molded article was obtained in the same manner as in Example 1, except that a plate-like resin with a thickness of 3 mm was obtained by setting the clearance of the gap constituted of the two glass plates and the soft polyvinyl chloride gasket to 3 mm, then, the stretching step was not carried out.

When the transparency of the resin was visually confirmed, it was transparent. When the transparency of the molded article was visually confirmed, it was transparent.

The Herman's degree of orientation f, haze and impact resistance of the resulting molded article were measured and evaluated. The results are shown in Table 1.

Comparative Example 5

(1) Production of Polyrotaxane Compound

Three hundred forty grams (340 g) of "SeRM (registered trademark) Super Polymer SH3400P (manufactured by Advanced Soft Material Co., Ltd.)" having a weight-average molecular weight of 700,000 obtained by reacting ε-caprolactone with a polyrotaxane comprising α-cyclodextrin, polyethylene glycol (PEG) having a weight-average molecular weight of 35,000 and adamantane groups was dissolved at room temperature in 1300 mL of dehydrated methyl methacrylate. Methacryloyloxyethyl isocyanate (6.8 mL) was added, and dibutyltin dilaurate as a catalyst was added in an amount of 1 part by mass with respect to 100 parts by mass of methacryloyloxyethyl isocyanate. Then, the mixture was stirred at room temperature for 5 days, to obtain a polyrotaxane compound.

(2) Production of Resin and Production of Molded Article by Stretching

Ten (10) parts by mass of the polyrotaxane compound obtained in the above (1), 89.9 parts by mass of methyl methacrylate, and 0.1 part by mass of 2,2'-azobisisobutyronitrile were added and mixed. Next, the obtained mixture was poured into a cell having a gap clearance of 4 mm constituted of two glass plates and a soft polyvinyl chloride gasket, and the mixture was polymerized by heating in a polymerization tank using air as a heat medium at 70° C. for 3 hours, then, at 120° C. for 40 minutes, to obtain a plate-like resin having a thickness of 4 mm. The glass transition temperature of the resin was 78° C.

The obtained resin was uniaxially stretched 1.2 times at 23° C. to obtain a molded article.

The haze and impact resistance of the obtained molded article were measured and evaluated. The results are shown in Table 1.

Comparative Example 6

A resin was obtained in the same manner as in Comparative Example 5, except that "SeRM (registered trademark) Super Polymer SH2400P (manufactured by Advanced Soft Materials Co., Ltd.), hydroxyl value 76 mg KOH/g)" having an average molecular weight of 400,000 obtained by reacting ε-caprolactone with a polyrotaxane comprising α-cyclodextrin, polyethylene glycol (PEG) having a weight-average molecular weight of 20000 and adamantane groups was used instead of SeRM (registered trademark) Super Polymer SH3400P. The resin glass transition temperature was 80° C.

The obtained resin was uniaxially stretched 1.1 times at 23° C. to obtain a molded article.

The haze and impact resistance of the obtained molded article were measured and evaluated. The results are shown in Table 1.

TABLE 1

| | structural unit of resin | stretching temperature (° C.) | stretch ratio (times) | Hermann's degree of orientation f | haze (%) | impart resistance |
|---|---|---|---|---|---|---|
| Example 1 | polyrotaxane compound/methyl methacrylate | 140 | 1.3 | 0.008 | 2.0 | A |
| Example 2 | | 140 | 2.0 | 0.015 | 2.3 | A |
| Example 3 | | 140 | 2.7 | 0.020 | 2.0 | A |
| Example 4 | | 100 | 2.7 | 0.031 | 2.1 | A |
| Example 5 | | 140 | 5.3 | 0.040 | 3.4 | A |
| Comparative Example 1 | methyl methacrylate | 140 | 2.0 | 0.014 | 0.3 | B |
| Comparative Example 2 | | 140 | 2.7 | 0.017 | 0.3 | B |
| Comparative Example 4 | polyrotaxane compound/methyl methacrylate | — | — | 0.001 | 4.4 | B |
| Comparative Example 5 | | 23 | 1.2 | — | 20.0 | B |
| Comparative Example 6 | | 23 | 1.1 | — | 50.0 | B |

DESCRIPTION OF NUMERALS

1: polyrotaxane compound
2: cyclic molecule comprising functional group capable of addition polymerization with carbon-carbon double bond
3: linear molecule
4: blocking group

The invention claimed is:

1. A molded article comprising a resin, wherein
said molded article has a Hermann's degree of orientation f of 0.006 or more which is determined by the following formula (1) and the following formula (2) based on an azimuth angle distribution curve obtained by wide-angle X-ray diffraction measurement and a haze of less than 10%,
said resin comprises a structural unit derived from a monomer comprising a carbon-carbon double bond at the end, and a structural unit derived from a polyrotaxane compound, and
said polyrotaxane compound comprises
cyclic molecules comprising a functional group capable of addition polymerization with the carbon-carbon double bond,
a linear molecule clathrated in a skewer shape by the cyclic molecules and
blocking groups disposed at the ends of the linear molecule to prevent elimination of the cyclic molecules:

[Chemical Formula]

$$f = \frac{3\langle\cos^2\phi\rangle - 1}{2} \qquad \text{formula (1)}$$

$$\langle\cos^2\phi\rangle = \frac{\int_0^{\pi/2} I(\phi)\cos^2\phi \sin\phi\, d\phi}{\int_0^{\pi/2} I(\phi)\sin\phi\, d\phi} \qquad \text{formula (2)}$$

wherein $I(\varphi)$ represents the luminance at the azimuth angle $\varphi$ in the azimuth angle distribution curve obtained by wide-angle X-ray diffraction measurement.

2. The molded article according to claim 1, wherein the functional group capable of addition polymerization with the carbon-carbon double bond is a (meth)acryloyl group.

3. The molded article according to claim 1, wherein said monomer comprising a carbon-carbon double bond at the end is a (meth)acrylic acid ester.

4. An automotive material comprising the molded article according to claim 1.

5. A display window protective plate comprising the molded article according to claim 1.

6. A method of producing the molded article according to claim 1,
said production method comprising a step of stretching the resin at a temperature not lower than 30° C. lower than the glass transition temperature of the resin and lower than the thermal decomposition temperature of the resin.

\* \* \* \* \*